United States Patent [19]
Chao

[11] Patent Number: 5,631,719
[45] Date of Patent: *May 20, 1997

[54] SPECTACLE FRAME HAVING RESILIENT COUPLING

[76] Inventor: David Y. Chao, 1120 Green Acre Rd., Towson, Md. 21204

[*] Notice: The portion of the term of this patent subsequent to Mar. 29, 2016, has been disclaimed.

[21] Appl. No.: 655,862

[22] Filed: May 31, 1996

[51] Int. Cl.$^6$ .............................. G02C 5/22; G02C 5/16
[52] U.S. Cl. ...................... 351/153; 351/113; 351/121; 16/228
[58] Field of Search ................................. 351/111, 113, 351/114, 119, 121, 153; 16/228

[56] References Cited

U.S. PATENT DOCUMENTS 4,269,488  5/1981  Zancaner ............................ 351/113

Primary Examiner—Huy Mai
Attorney, Agent, or Firm—Charles E. Baxley, Esq.

[57] ABSTRACT

A spectacle frame includes two side extensions each having a channel for rotatably receiving two rotary members. A pair of legs are secured to the outer rotary members. A resilient ring is engaged around the rotary members so as to couple the rotary members together. The extensions each includes a curved slot for receiving a rod of an outer rotary member. When the rod is moved along the curved slot against the ring, the ring may relatively bias the outer rotary member and the legs backward to working position so as to form a resilient coupling.

6 Claims, 2 Drawing Sheets

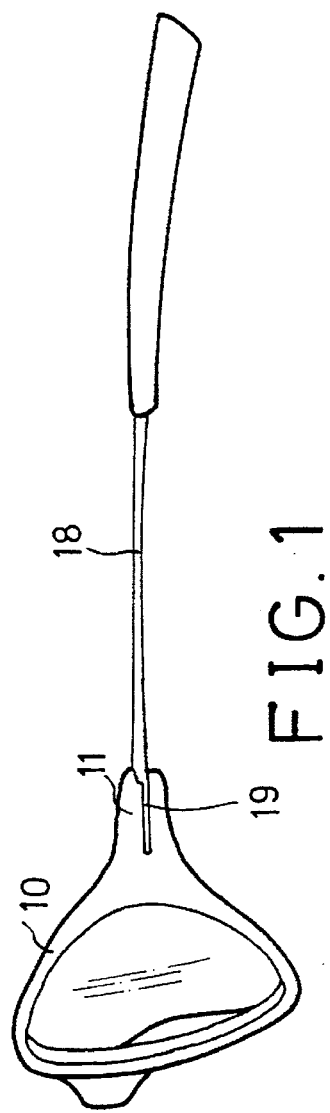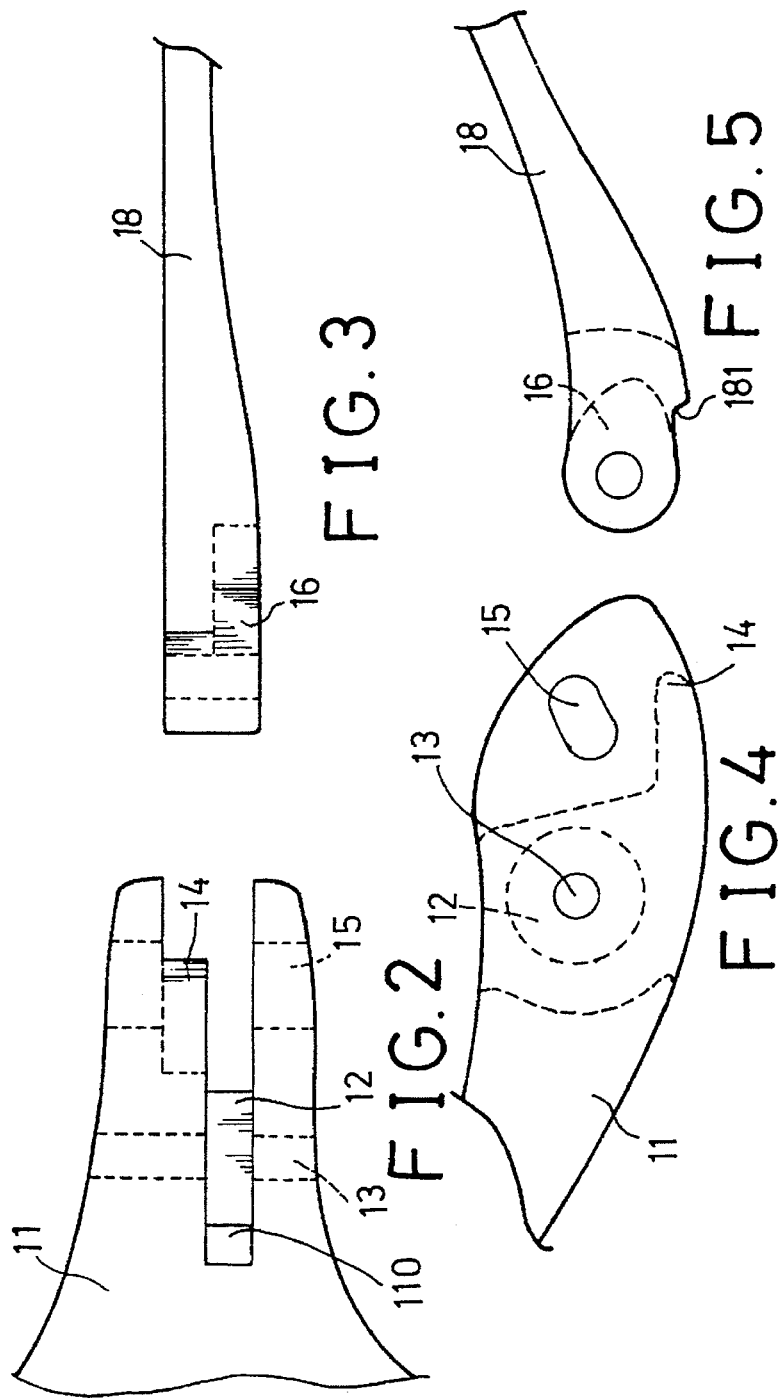

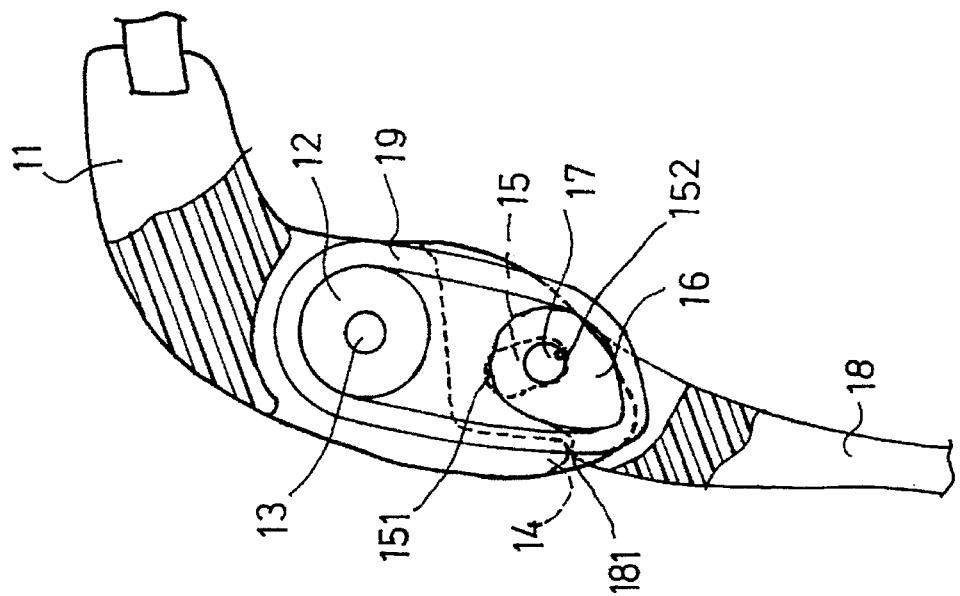
FIG. 8
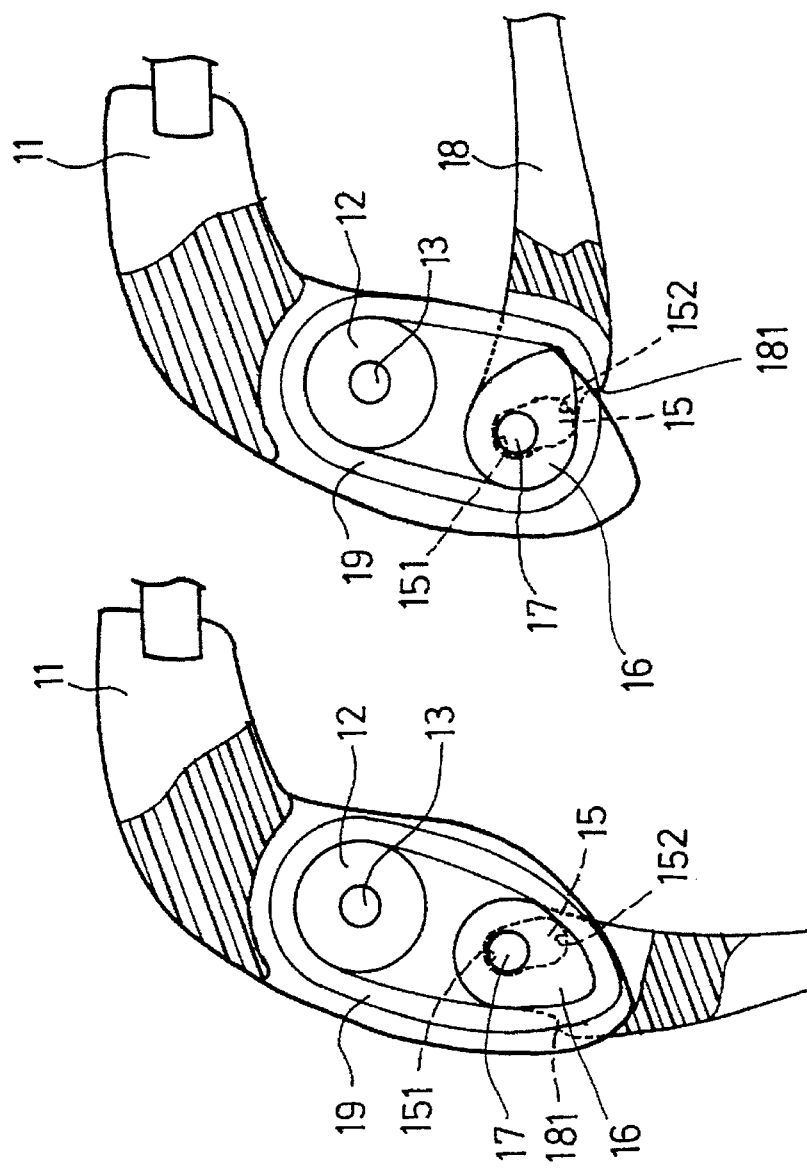
FIG. 7
FIG. 6

SPECTACLE FRAME HAVING RESILIENT COUPLING

BACKGROUND OF THE INVENTION

1. Field of the Invention

The present invention relates to a spectacle frame, and more particularly to a spectacle frame having two legs coupled to the frame by pulley and ring members.

2. Description of the Prior Art

Typical spectacle frames comprise a pair of legs pivotally coupled to the frame bodies by typical hinges or by spring action hinges for resiliently coupling the legs to the frame bodies.

The present invention has arisen to provide a novel spectacle frame.

SUMMARY OF THE INVENTION

The primary objective of the present invention is to provide a spectacle frame having two legs coupled to the frame by pulley and ring members.

In accordance with one aspect of the invention, there is provided a spectacle frame comprising a frame body including two side portions each having an extension extended therefrom, the extensions each including a channel laterally formed therein and having a first and a second rotary members rotatably secured therein, a pair of legs each including a first end secured to the second rotary members as to allow the legs to be rotated in concert with the second rotary member, and means for coupling the first and the second rotary members together.

The first and the second rotary members may be a wheel or a cam.

The coupling means includes a ring engaged around the first and the second rotary members so as to couple the first and the second rotary members together.

The extensions each includes a stop formed therein, the legs each includes a shoulder for engaging with the stop. The extensions each includes a curved slot formed therein and having a center curvature located at the stop and having a first end and a second end, the second rotary member includes a rod slidably engaged in the curved slot, the coupling means includes a ring engaged around the first and the second rotary members for pulling the rod toward the first end of the curved slot and for allowing the rod to be moved toward the second end of the curved slot against the ring when the shoulder of the leg is engaged with the stop and when the leg and the second rotary member are forced to rotate about the stop. The legs may thus be forced to resiliently engage with the head of the user so as to form a resilient coupling.

Further objectives and advantages of the present invention will become apparent from a careful reading of a detailed description provided hereinbelow, with appropriate reference to accompanying drawings.

BRIEF DESCRIPTION OF THE DRAWINGS

FIG. 1 is a side plane view of a spectacle frame in accordance with the present invention;

FIGS. 2 and 3 are partial side views of the extension and the leg respectively;

FIGS. 4 and 5 are partial top views of the extension and the leg respectively; and FIGS. 6, 7 and 8 are schematic views illustrating the operations of the legs relative to the spectacle frame.

DETAILED DESCRIPTION OF THE PREFERRED EMBODIMENT

Referring to the drawings, and initially to FIGS. 1 and 2, a spectacle frame in accordance with the present invention comprises a frame body 10 for supporting lenses therein. The frame body 10 includes two side portions each having an extension 11 extended therefrom. The extensions 11 each includes a channel 110 laterally formed therein for rotatably receiving a rotary member, such as a wheel 12 therein by a shaft 13 and located close to the lenses. The extensions 11 each includes a free end portion having a stop 14 provided therein and located above the channel 110 (FIG. 2). The free end portion of the extension 11 includes a curved slot 15 formed therein. The center of curvature of the curved slot 15 is preferably located at the stop 14. A rod 17 is slidably engaged in the curved slot Another rotary member, such as a cam 16 is engaged in the channel 110 ad secured to the rod 17 such that the cam 16 is also slidable along the curved slot 15. A pair of legs 18 each includes one end secured to the cam 16 such that the leg 18 rotates in concert with the cam 16. A resilient ring 19 is engaged around the wheel 12 and the cam 16 so as to couple the wheel 12 and the cam 16 together. The ring 19 is preferably made of rubber material such that the ring 19 includes a resilient characteristic. The legs 18 each includes a shoulder 181 formed therein for engaging with the stop 14 so as to force the rod 17 to move along the curved slot 15. The ring 19 is required to be engaged around the wheel 12 before the shaft 13 is secured in place. The ring 19 is also engaged around the cam 16 before the cam 16 is engaged into the channel 110. The pin is then engaged through and secured to the cam 16 such that the wheel 12 and the cam 16 and the ring 19 may be easily assembled.

In operation, as shown in FIG. 6, the cam 16 and the ring 19 are arranged such that the ring 19 may apply a force to the cam 16 so as to force the shoulder 181 of the leg 18 to engage with the stop 14 such that the legs 18 may be maintained at the open or working position as shown in FIG. 6. At this moment, the rod 17 is pulled toward one end 151 of the curved slot 15 by the ring 19 and located closer to the wheel 12. As shown in FIG. 7, when the leg 18 is rotated toward the lenses or toward a folded position, the ring 19 may apply a force against the cam 16 so as to pull the cam 16 to the folded position as shown in FIG. 7. At this moment, the rod 17 may also be pulled, by the ring 19, toward the one end 151 of the curved slot 15 that is located closer to the wheel 12.

As shown in FIG. 8, when the leg 18 is located at the working position and is moved or rotated outward, the shoulder 181 is engaged with the stop 14 such that both the leg 18 and the cam 16 may be forced to rotate about the stop 14. At this moment, the cam 16 may apply a force against the ring 19 so as to allow the rod 17 to move toward the other end 152 of the curved slot 15. At this moment, the rod 17 has a tendency to be pulled toward the one end 151 of the curved slot 15 by the resilient ring 19 such that the leg 18 may also be biased to move backward to the working position as shown in FIG. 6, such that the legs 18 may be biased to engage with the user's head onto which the spectacle frame is engaged.

Alternatively, the position of the wheel and the cam may be changed, or the wheel may be replaced by a cam, and/or the cam may be replaced by a wheel. The only requirement is that a ring is engaged with the two rotary members for coupling the rotary members together.

Accordingly, the spectacle frame in accordance with the present invention includes a novel structure having two rotary members rotatably secured in the side extensions and coupled together by a resilient ring. In addition, a special design allows the legs to be resiliently forced against the user's head.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A spectacle frame comprising:

a frame body including two side portions each having an extension extended therefrom, said extensions each including a channel laterally formed therein and having a first and a second rotary members rotatably secured therein, a pair of legs each including a first end secured to said second rotary members as to allow said legs to be rotated in concert with said second rotary member, and means for coupling said first and said second rotary members together.

2. A spectacle frame according to claim 1, wherein said first rotary member is a wheel.

3. A spectacle frame according to claim 1, wherein said first rotary member is a cam.

4. A spectacle frame according to claim 1, wherein said coupling means includes a ring engaged around said first and said second rotary members so as to couple said first and said second rotary members together.

5. A spectacle frame according to claim 1, wherein said extensions each includes a stop formed therein, said legs each includes a shoulder for engaging with said stop.

6. A spectacle frame according to claim 5, wherein said extensions each includes a curved slot formed therein and having a center curvature located at said stop and having a first end and a second end, said second rotary member includes a rod slidably engaged in said curved slot, said coupling means includes a ring engaged around said first and said second rotary members for pulling said rod toward said first end of said curved slot and for allowing said rod to be moved toward said second end of said curved slot against said ring when said shoulder of said leg is engaged with said stop and when said leg and said second rotary member are forced to rotate about said stop.

* * * * *